(12) United States Patent
Hindle et al.

(10) Patent No.: US 7,849,064 B2
(45) Date of Patent: Dec. 7, 2010

(54) APPLICATION PROGRAMMING INTERFACE COMBINING ASSET LISTINGS

(75) Inventors: James Hindle, London (CA); Peter G. N. Scheyen, London (CA); Mark A. Vickers, Belmont, CA (US)

(73) Assignee: TVWorks, LLC, Philadelphia, PA (US)

( * ) Notice: Subject to any disclaimer, the term of this patent is extended or adjusted under 35 U.S.C. 154(b) by 398 days.

(21) Appl. No.: 11/103,297

(22) Filed: Apr. 11, 2005

(65) Prior Publication Data

US 2006/0161951 A1    Jul. 20, 2006

Related U.S. Application Data

(63) Continuation-in-part of application No. 11/038,298, filed on Jan. 19, 2005.

(60) Provisional application No. 60/564,703, filed on Apr. 23, 2004.

(51) Int. Cl.
*G06F 7/00* (2006.01)

(52) U.S. Cl. ........................................ 707/705; 725/131

(58) Field of Classification Search ............... None
See application file for complete search history.

(56) References Cited

U.S. PATENT DOCUMENTS

| 5,579,055 | A |   | 11/1996 | Hamilton et al. |
| 5,808,694 | A | * | 9/1998 | Usui et al. ............... 725/49 |
| 6,075,570 | A | * | 6/2000 | Usui et al. ............... 725/49 |
| 6,539,374 | B2 |  | 3/2003 | Jung |
| 7,162,697 | B2 | * | 1/2007 | Markel ................... 715/717 |
| 2002/0088008 | A1 |  | 7/2002 | Markel |
| 2002/0188944 | A1 | * | 12/2002 | Noble .................... 725/39 |
| 2003/0009769 | A1 | * | 1/2003 | Hensgen et al. ........ 725/131 |
| 2003/0041104 | A1 | * | 2/2003 | Wingard et al. ........ 709/203 |
| 2003/0088876 | A1 |  | 5/2003 | Mao et al. |
| 2005/0278741 | A1 | * | 12/2005 | Robarts et al. .......... 725/46 |

* cited by examiner

*Primary Examiner*—Charles Rones
*Assistant Examiner*—Dinku W Gebresenbet
(74) *Attorney, Agent, or Firm*—Banner & Witcoff Ltd.

(57) ABSTRACT

A system, method and API for processing and providing a unified list of the content offerings of multiple content sources.

23 Claims, 8 Drawing Sheets

APPLICATION PROGRAMMING INTERFACE COMBINING ASSET LISTINGS

CROSS REFERENCE TO RELATED APPLICATIONS

This application claims the benefit of U.S. provisional patent application Ser. No. 60/564,703, filed on Apr. 23, 2004. This application is also a continuation-in-part of U.S. patent application Ser. No. 11/038,298, filed on Jan. 19, 2005, which is incorporated herein by reference in its entirety, and which claims the benefit of U.S. provisional patent application Ser. No. 60/564,703, filed on Apr. 23, 2004.

BACKGROUND OF THE INVENTION

1. Field of the Invention

The invention relates generally to information delivery systems and, more particularly, to providing a unified list of broadcast and other events available to a user of a set top box.

2. Description of the Related Art

There is a wide variance in the hardware capabilities of set top boxes (STBs) coexisting on a single radio frequency (RF) network, such as a cable television or satellite television distribution system. All of these STBs typically require the basic data normally associated with, for example, an interactive program guide (IPG) application operating within a middleware environment such that provided by Liberate Technologies, Inc., of San Mateo, California. The basic data includes several descriptor fields for each program, such as program title, rating, description, showing times and the like. This commonality of basic data leads to a database design geared towards the lowest common denominator of boxes. Such a database design, while useful in serving a group of STBs or other clients, is far from optimal in serving at least the higher capability STBs or other clients.

SUMMARY OF THE INVENTION

Various deficiencies of the prior art are addressed by the present invention of an application programming interface (API) and method that allows retrieval of broadcast and VOD events, optionally along with other accessible recorded content. An application utilizing the API may specify any combination of available data sources. In this manner, the combination of the data sources may be performed at a server, if possible, responding to the query rather than forcing a set top box application such as an EPG application or middleware API implementation to perform this merge on the set top box unnecessarily.

A method according to one embodiment of the invention comprises: receiving a filter object indicative of search criteria; querying each of a plurality of data sources using the filter object; merging record sets provided by the queried data sources into a unified list; and providing a notification that the unified list of record sets is available.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention will be generally described within the context of an information distribution system that propagates content (e.g., movies, sports and the like), various services (e.g., video on demand, Interactive Program Guide and the like) and applications (e.g., billing and other services) to clients or set top boxes associated with users. It will be appreciated by those skilled in the art that while the invention has specific utility within the context of the systems described herein, the invention has broad applicability to any system which queries multiple distinct data sources for data items with a set of common base data fields.

Figure 1:
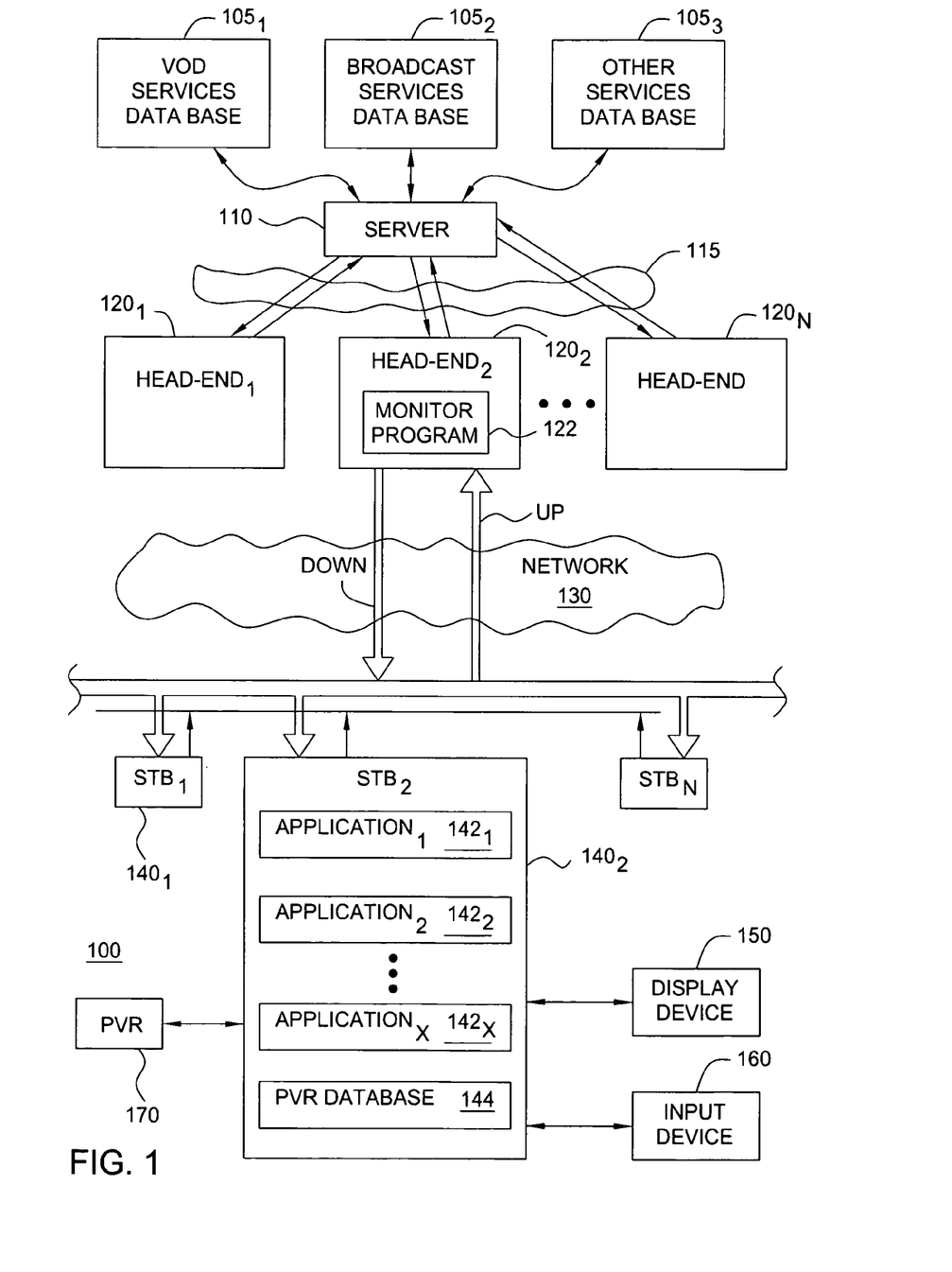
FIG. 1 depicts a high-level block diagram of an information distribution system suitable for use with the present invention.

FIG. 1 depicts a high level block diagram of a information distribution system suitable for use with the present invention. Specifically, the system 100 of FIG. 1 comprises a server 110, a provisioning network 115, a plurality of head-ends 120$_1$ through 120$_N$ (collectively head-ends 120), a network 130 and a plurality of set-top boxes STBs 140$_1$ through 140$_N$ (collectively set top STBs 140). The server 110 is associated with a plurality of databases 105, illustratively a video on demand (VOD) database 105$_1$, a broadcast services database 105$_2$ and other databases 105$_3$. These databases 105 may be local (e.g., at a content aggregation point within or proximate the server) or remote (e.g., at a content provider point such as a studio or cable services source). Each STB is typically associated with a respective presentation device 150 such as a television or other video display device, and a user input device 160 such as a remote control, pointing device and the like. Optionally, a personal video recorder (PVR) 170 may be utilized with the STB 140. In FIG. 1, the PVR 170 is depicted as a distinct device in communications with the STB 140; however, the PVR 170 may also be integrated into the STB 140 as is known in the art.

The server 110 is used to store and provide various assets such as audio-visual content, music, data, applications and the like to the head-ends 120. The server may be associated with individual or multiple content suppliers and/or application providers. The server 110 communicates with the various head-ends 120 via a provisioning network 115. The provisioning network may comprise any network topology supporting the conveyance of information to and from the server 110. Moreover, while depicted as separate components, the invention may be implemented within a system wherein the server 110 and head-end 120 are implemented within the same functional element. Generally speaking, the server 110 operates in part to provide information to, and receive information from, the STBs 140 via their respective head-ends 120 and network 130. The information propagated between the server 110 and STBs 140 is processed as appropriate by the head-end 120 and network 130.

Each of the head-ends 120 is associated with a neighborhood of STBs. For simplicity, only those STBs associated with the second head-end 120₂ are shown and described herein. Each head-end 120 operates to communicate content and other data to its respective neighborhood of STBs by broadcast channels received by all STBs, narrowcast channels received by some of the STBs or point cast channels received by individual STBs. The head-ends 120 also interact with their STBs 140 to establish and tear down sessions with the STBs as necessary to enable the delivery of content, information services, applications, and the like. Generally speaking, the head-ends 120 operate to distribute content and other information provided by the server to the set-top boxes as appropriate, as well as return STB messages, billing information and other data to the server.

Each head-end 120 communicates with the STBs 140 within its neighborhood via a relatively high bandwidth forward or downstream communications channel DOWN and a relatively low bandwidth reverse or upstream communications UP. The downstream DOWN and upstream UP communications channels are supported by a network topology 130, such as a hybrid fiber-coax cable television distribution system, a satellite distribution system (e.g., using a telephone network or reverse satellite link for upstream communications) and the like. While not shown in FIG. 1, an out-of-band (OOB) forward communications channel may also be supported by the network topology 130. In such an implementation of the network topology 130, control messages and other information may be supplied to the STBs 140 via in-band messaging using the downstream communications channel DOWN or via out-of-band messaging using a forward communications channel (not shown).

The STBs 140 operate to receive broadcast (to most or all STBs), narrowcast (to a region or defined group of STBs) or pointcast (to one STB, also known as a unit singlecast) information from the head-ends 120 via the network 130 using the downstream communications channel DOWN (or out-of-band forward channel).

Second STB 140₂ within the neighborhood associated with second head-end 120₂ is depicted as including a plurality of application programs 142₁-142ₓ(application programs 142). The application programs 142 may comprise any of the applications used within the context of an STB 140, such as an interactive program guide (IPG) application, a VOD selection/billing application and the like. Where an optional PVR 170 is utilized, a PVR database 144 is included within (or associated with) the STB 140. The PVR database 144 includes information pertaining to recorded assets (e.g., title, record channel, record time, duration and the like). Additional information for the PVR database 144 may include a searchable list of recorded content available to the STB. The list may include information such as found in other databases 105, such as title, genre, director, actors, MPAA or other rating, key words, program description and the like.

Within the system 100 of FIG. 1, the clients or STBs 140 may comprise, illustratively, "heavy" set top boxes or "thin" set top boxes, where a heavy STB or client has significant computational and/or memory resources while a thin STB or client has constrained memory and/or computational resources. Rather than simply "heavy" or "thin" set top boxes, many more classes of set top boxes may be deployed. To simplify the discussion, it will be assumed that within the system 100 of FIG. 1, three classes of set top boxes are deployed.

Figure 2:
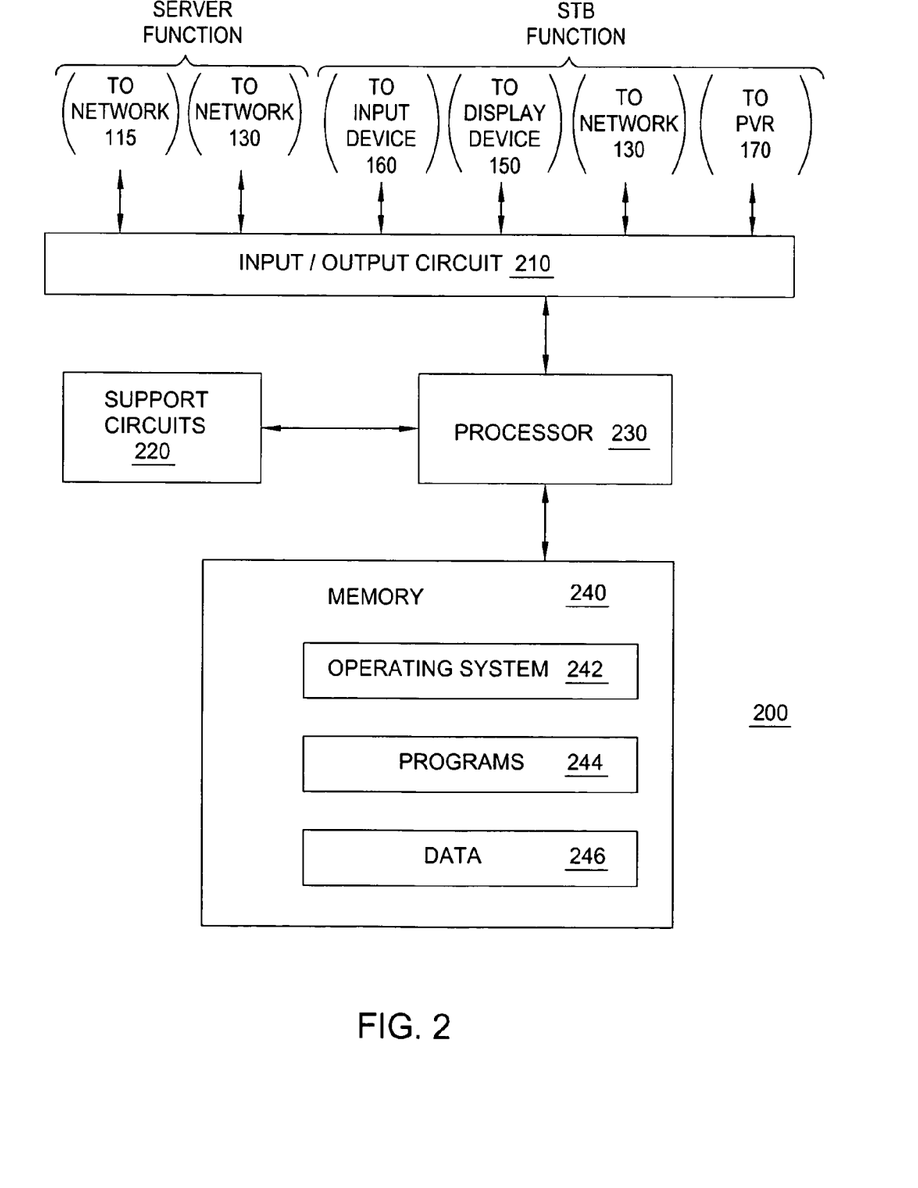
FIG. 2 depicts a high level block diagram of a controller topology suitable for use in the information distribution system of FIG. 1.

FIG. 2 depicts a high level block diagram of a controller topology suitable for use in the system 100 of FIG. 1. Specifically, the controller 200 of FIG. 2 may be employed to implement relevant functions within the server 110, head-end 120, and/or STB 140.

The controller 200 of FIG. 2 comprises a processor 230 as well as memory 240 for storing various control programs and other programs 244 and data 246. The memory 240 may also store an operating system 242 supporting the programs 244.

The processor 230 cooperates with conventional support circuitry such as power supplies, clock circuits, cache memory and the like as well as circuits that assist in executing the software routines stored in the memory 240. As such, it is contemplated that some of the steps discussed herein as software processes may be implemented within hardware, for example as circuitry that cooperates with the processor 230 to perform various steps. The controller 200 also contains input/output (I/O) circuitry 210 that forms an interface between the various functional elements communicating with the controller 200.

Although the controller 200 is depicted as a general purpose computer that is programmed to perform various control functions in accordance with the present invention, the invention can be implemented in hardware as, for example, an application specific integrated circuit (ASIC) or field programmable gate array (FPGA). As such, the process steps described herein are intended to be broadly interpreted as being equivalently performed by software, hardware or a combination thereof.

Topologies such as those depicted with respect to the controller 200 of FIG. 2 may be advantageously employed within the context of the server 110, head-end 120, network 130 and/or STB 140. That is, by utilizing appropriate operating systems 242, programs 244 and/or data 246, the topology depicted with respect to controller 200 is used to realize the functional elements discussed herein with respect to the various figures. As noted in FIG. 2, the I/O circuitry 210 communicates with network 115 as part of a server function, communicates with network 115 and network 130 as part of a head-end function, and communicates with input device 160, display device 150, network 130 and PVR 170 as part of an STB function.

The invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast media or other signal bearing medium, and/or stored within a working memory within a computing device operating according to the instructions.

According to an embodiment of the present invention, basic data records or structures area adapted to include an "Extension Record," which refers back to an original, basic record and has specific data associated with it. For example, a basic event record (i.e., a basic record associated with an event such as a pay per view event or VOD asset) may be extended to include a promotional image or jacket art. This solution allows the addition of new data fields to an existing record without requiring changes to the middleware supporting an application or service. Instead, a new 'extension type' is defined on the server for all applicable set top box classes, and an application request the appropriate extension record for each applicable base record to access the new fields.

In order to allow low-powered set top boxes to provide as much data as possible, such as interactive program guide data, the data records themselves are minimized, and all set top boxes use the same records to conserve bandwidth (i.e., broadcasting multiple versions of the data for different boxes is wasteful). For this reason, we choose to 'extend' the basic data provided for each data record with optional 'data extension' records that can either be accepted or ignored by each set top box.

In one embodiment of the invention, for each type of data record provided by a database 105 or 144 (i.e. Event, Service, Event Details, Message, Application, etc.), a corresponding number of 'Extension types' are provided. Each record type/extension type pair on creation at the server is assigned one of four priorities (never store, low, high, or always store) for each of the three set top box classes (low-end, mid-range, high-end).

In one embodiment of the invention, for each specific record of a given type, if the record has data applicable to one of the extension records, the server formats that data as an extension record. The extension record is accessed by an applet or other client program, which client program has the ability to interpret and otherwise process the extra data. Thus, data structures suitable for use within the context of the present invention may be utilized by an application programming interface (API) within a middleware environment (e.g., on a set top box). For example, in one embodiment for Event Records, an Extension Type 1 contains an image. This is assigned a 'low' priority on all but high end boxes where, illustratively, the records are to be 'always' stored. In this case an applet, such as an applet implementing an interactive program guide, when displaying details for a given event may request the extension type 1 for the current event identifier and will be returned data which the applet then interprets as, illustratively, an image to display promotional artwork related to the event.

The invention provides several advantages, such as (1) additional data geared to high end boxes may be provided without encumbering low-end boxes with the data or duplicating basic information for the high-end boxes; (2) additional data fields can be added to the data schema without requiring changes to the middleware; and (3) a server UI component allows the addition of new extension record types dynamically so changes can be driven from third party applications; and (4) third party software developers to may extend existing listing (or other data) without needing changes to either the middleware or server (e.g., they can dynamically add new fields targeted to the set top boxes on which they want their application to run).

Figure 3:
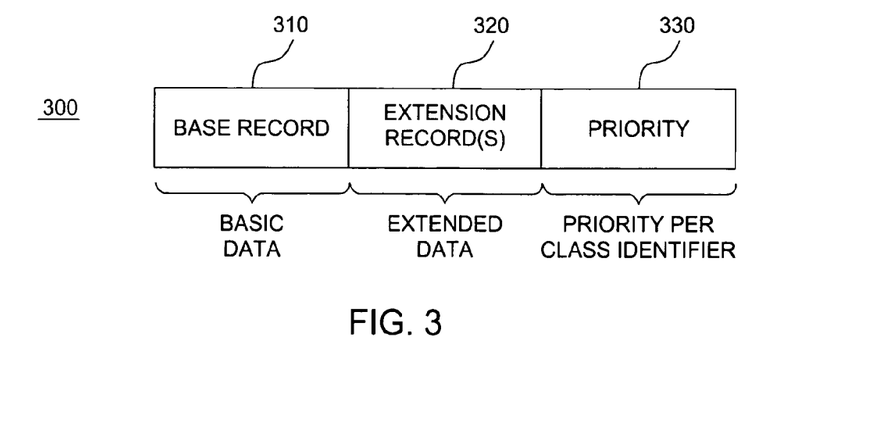
FIGS. 3, 4 and 5 depict flow diagrams of methods according to embodiments of the present invention.

FIG. 3 depicts a data structure suitable for use with the present invention. Specifically, FIG. 3 depicts a single data structure 300, illustratively a record within a database including a plurality of similarly structured records. The data structure 300 comprises a base record portion 310, an extension portion 320 and a priority portion 330.

The base record portion 310 comprises basic data from a database associated with a service provider, such as a video on demand (VOD) provider, broadcast listing provider, application provider or other service provider. The basic data within the base record 310 comprises data that is to be used by every set top box within an information distribution system, regardless of class level (i.e., thin client, thick client and the like).

The extension portion(s) 320 is used to store extended data or a pointer, address or other indicator to the location of the extended data. The extended data may comprise still or moving imagery (e.g., promotional imagery and the like); content related information such as title, genre, actors and the like; as well as other data useful in implementing an advanced service or function within the client device. Generally speaking, extended data stored within (or pointed to by) the extension portion 320 of the data structure 300 comprises any data that may be used to supplement the service or application supported by the basic data within the base record portion 310.

The priority portion 330 includes priority per class identifier data. Specifically, use of the extended data is optionally divided into a plurality of priority levels, depending on the type of extended data provided. Some extended data may be crucial (such as billing information), while other extended data may be merely useful to provide. Additionally, the priority level of the extended data is optionally related to the capability or class of a set top box receiving the data structure 300.

For illustrative purposes, four priority levels are used; namely, Never Store (NS), low (L), high (H), and Always Store (AS). Extended data associated with a NS priority level is never stored by the set top box, while extended data associated with an AS priority level is always stored by the set top box. High priority data is preferentially stored before low priority data, and then only if memory remains after the storage of the always store data. The priority levels are used to provide guidance to the STB during the processing of extended data.

For illustrative purposes, the set top boxes are divided into three classes; namely, Low End (LE), Mid-Range (MR), and High End (HE), set top boxes. A low end set top box may be considered to be a thin client set top box (i.e., severely constrained computational and/or memory resources). A high end set top box may be considered to be a thick client (i.e., ample computational and/or memory resources). A mid range set top box may be considered as having some constraints on memory and/or computational ability. The STB classes are used to differentiate between set top boxes based upon a capability level, such as a capability level identified according to processing and/or memory constraints.

It should be noted that a single base record 310 may be associated with multiple extension records 320, and that each of the multiple extension records may be associated with a different set of priorities. For example, an event record may have an image extension to be stored on heavy set top boxes only, and a third party data extension to be stored on all set top boxes (e.g., to enable access to a third party application by all set top boxes).

Generally speaking, the invention operates to provide services/functions at a level of functionality appropriate to each set top box. Basic services are nominally provided via the base record portion 310 of the data structure 300. Where additional processing and/or memory resources are available at the STB, enhanced services and/or functions are provided via the extension record portion 320 of the data structure 300. The suitability of extended data for use in a particular set top box is based on the importance of the extended data to an application or service (i.e., the priority), as well the ability of the set top box to process the extended data (i.e., the STB class). In this manner, basic application of functionality is delivered to each class of set top box, while those set top boxes capable of or benefiting from additional features are given the opportunity to utilize such features via extended data delivery within the extension portion 320 of the data structure 300.

Figure 4:
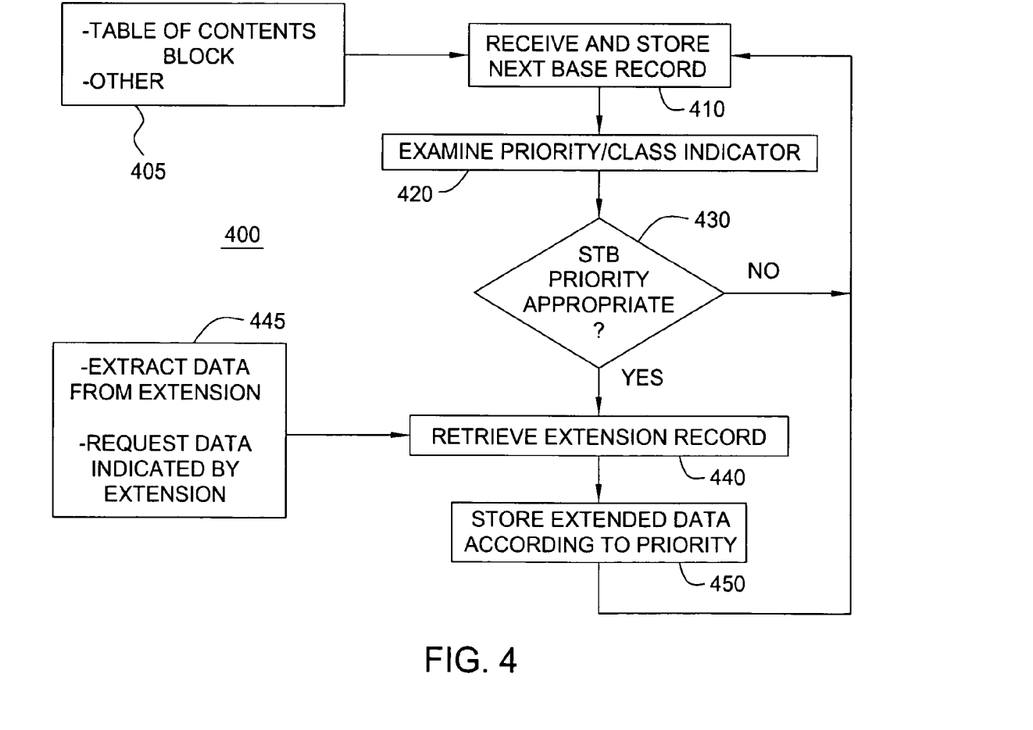

FIG. 4 depicts a high level block diagram of a data processing routine according to an embodiment of an invention. Specifically, the data processing routine 400 of FIG. 4 is adapted for use within a set top box processing a data stream including data structures such as those described above with respect to FIG. 3.

At step 410, a next base record is received and stored. Referring to box 405, the next base record is identified via a basic data record operating as a "table of contents" block which identifies all data blocks available including those for base records and extension records. Other means of identifying the next base record may also be used (e.g., a linked list approach).

At step 420, the priority/class indicator is examined to determine, at step 430, whether the extended data included within or referred to by the extension record is appropriate to the set top box. If the extended data is not appropriate, then the method 400 proceeds to step 410 to retrieve and store the next base record.

If the extended data is appropriate to the set top box, then at step 440 the extended data is retrieved and processed. Referring to box 445, the extension portion includes either the extended data or information to be utilized, or an address or other identification of the extended data or information to be utilized. That is, the contents of the extension portion 320 of the data structure may contain the specific information needed to invoke an advanced service or application function (e.g., a promotional file and the like), or an address or other indicator that is used merely to identify the specific information needed. If an address or indicator is provided, then at step 440 the STB propagates a signal back to the server to retrieve the specific information needed to invoke the advanced service or application function. The server processing of this request is discussed below with respect to FIG. 6.

At step 450, the extended data is stored according to the priority per class identifier. That is, extended data denoted as always store, high priority and/or low priority is stored as discussed above with respect to FIG. 3.

The routine of 400 of FIG. 4 is adapted to enabling a set top box to retrieve, process and optionally store extended data records that are associated with basic data or base records. This processing is performed in a prioritized manner and according to the capabilities of the set top box. Thus, the underlying structures utilized by a service or application may be the same for that application irrespective of the set top box within which that application is executed. The application only processes the extended data appropriate to its host set top box. In this manner, portability of applications, portability of data structures, and commonality of application services may be provided within the context of an information distribution system including set top boxes or clients having different capabilities.

Figure 5:
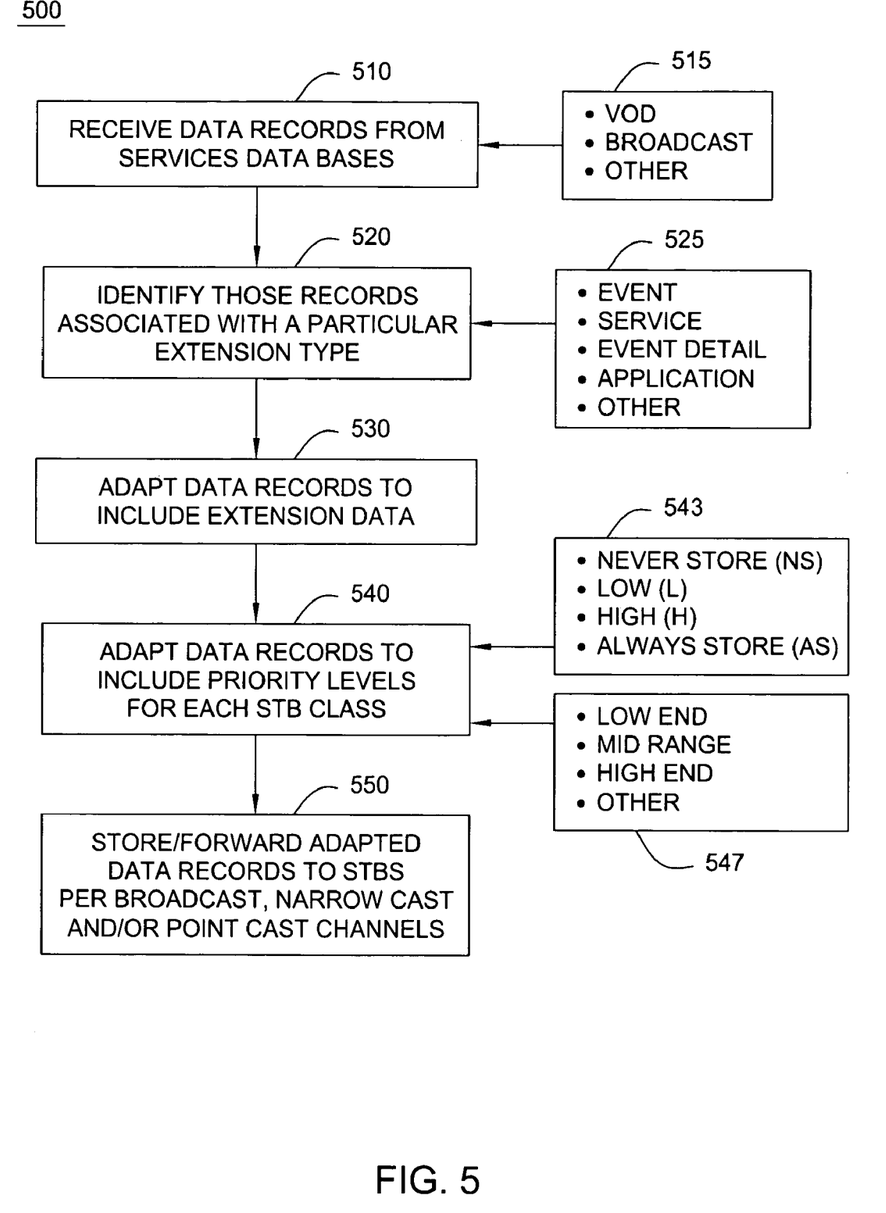

FIG. 5 depicts a flow diagram of a server-side method for processing data according to an embodiment of the invention. Specifically, FIG. 5 depicts a flow diagram of a data processing method 500 suitable for use in, for example, a server 110 or head-end 120 within the system 100 of FIG. 1. The method 500 of FIG. 5 is adapted to generating data structures useful in implementing various embodiments of the present invention.

At step 510, data records from a services database are received. Referring to box 515, the services database may comprise a video on demand (VOD) database, a broadcast listings database or some other application or services database.

At step 520, those records associated with a particular extension type are identified. Referring to box 525, the particular extension type may comprise an event type, a service type, an event detail, an application type or some other type. Numerous extension types may be defined.

At step 530, the received data records are adapted to include the extension data. That is, at step 530 the received data records are adapted to include a base record portion and an extension portion including a type identifier. Such adaptation may comprise, for example, the segmentation of application data into the basic data necessary to implement the application and extended data useful in providing enhanced application features or functions.

At step 540, the data records are adapted to include priority levels for each set top box class. Referring to box 543, the priority levels comprise, illustratively, a never store (NS), low (L), high (H), and always store (AS) priority level, as previously discussed. More or fewer priority levels may be utilized. Referring to box 547, the STB classes may comprise low end, mid range, high end, as previously discussed. More or fewer STB classes may be utilized.

At step 550, the adapted records are stored or forwarded to set top boxes per broadcast, narrowcast and/or point cast channels. That is, at step 550 the information provided by the modified data structure is propagated towards the set top boxes for subsequent processing and/or storage as appropriate to the service or application.

Figure 6:
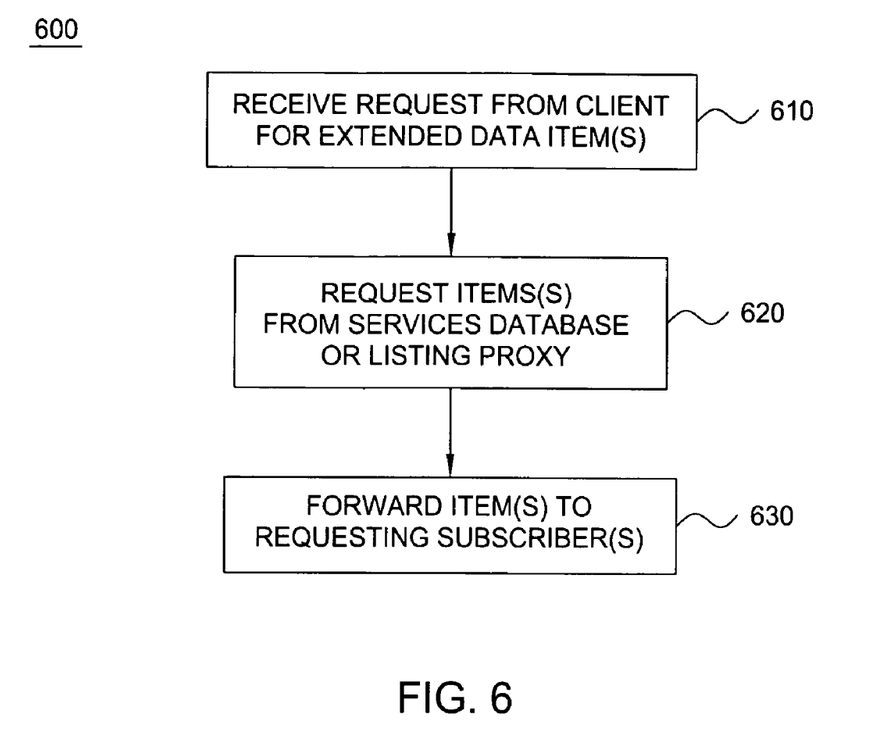
FIG. 6 depicts a flow diagram of a server-side method for processing a request according to an embodiment of the invention.

FIG. 6 depicts a flow diagram of a server-side method for processing a request according to an embodiment of the invention. Specifically, FIG. 6 depicts a flow diagram of a request processing method 600 suitable for use in, for example, a server 110 or head-end 120 within the system 100 of FIG. 1. The method 600 of FIG. 6 is adapted to responding to a STB request for information needed to invoke the advanced service or application function.

At step 610, a request for extended data item(s) is received from a client or, more specifically, a middleware API operating within the client to support an application or the application/applet itself.

At step 620, a request is propagated to the services database or listing proxy associated with the extended data item(s). For example, a listing proxy may comprise an application or functional entity that integrates content listings for both VOD and broadcast to provide an integrated listing. On those set top boxes where VOD operation is available, one application is the generation of such an integrated listing in a timely and accurate manner. Other services databases may be accessed to provide appropriate information in response to the STB request.

At step 630, the requested extended data item(s) are forwarded to the requesting STB or STBs.

The above methods be used independently or in any combination. More specifically, various functional elements within the system 100 of FIG. 1 may be used to perform all or only a portion of the processing tasks described with respect to the various Figures. For example, using the method 600 of FIG. 6, the proxy servers may be used to create merged VOD/broadcast listing IPG data. The data may be further processed by the server to provide additional IPG application data.

One embodiment of the invention relates to a JAVA application programming interface for providing unified access to video-on-demand, electronic program guide, and personal video recorder listings databases at a client device such as a set top box. The embodiment discussed herein with respect to a unified electronic program guide may be implemented using one or more of the techniques discussed above with respect to FIG. 6. It is also noted that the teachings discussed herein with respect to the unified electronic program guide structure may also be performed without using the above-described techniques, data structures, methods and the like.

In order to promote the assets available to users via video-on-demand (VOD), multiple system operators (MSOs) would like those assets to be displayed along with normal TV events where possible. For example, if a user searches for "movies," not only should the movies being shown on regular broadcast TV be included in a subsequently presented list, the VOD movie assets and, optionally, any personal video recorder (PVR) assets that are available should also be displayed.

Generally speaking, the PVR, VOD and normal broadcast information are all stored in different locations, and traditionally have been accessed by separate application programming interfaces (APIs) and via separate user interfaces. That is, a user must access different user interface screens to access content available from the different sources. There may be commonality in data structures, but there is no commonality in usage or access.

An electronic program guide (EPG) application may provide this functionality by querying a broadcast listing database (may be on a server or stored in a STB as part of a standard EPG database) and then querying a VOD asset server to produce two respective results. The EPG application then combines the results for display. A VOD asset is treated as a broadcast event except that the VOD asset is not associated with a particular channel or start time, since the asset is available at any time on demand (though typically provided via a special VOD channel).

However, this multiple step process provides unnecessary complication to the EPG application, and that complication must be repeated for each application 142 in which listings from both broadcast television and VOD are desired.

Within the context of the present invention, VOD assets, personal video recorder (PVR) assets and the like are integrated into a "listings database" for events, from which listings database are retrieved broadcast events, VOD assets, PVR assets and the like. VOD and/or PVR assets are optionally associated with additional data fields such as provided by the "data extension mechanisms" described above with respect to FIGS. 3-5. Thus, an application requesting a mixed set of VOD assets and broadcast events from the listing database forwards the request to a "listings proxy." The proxy in turn forwards the request to both the VOD asset provider and the listings provider, which responsively provide the respective listings. The proxy then merges the received listings and provides the merged listing to the requesting application. In this manner, the process appears seamless to the application, while providing a mix of events such as VOD assets and broadcast events. Thus, by treating VOD assets as a broadcast event without a channel or start time (optionally including the additional data if desired), seamless access to VOD and broadcast events from an application point of view is provided.

Figure 7:
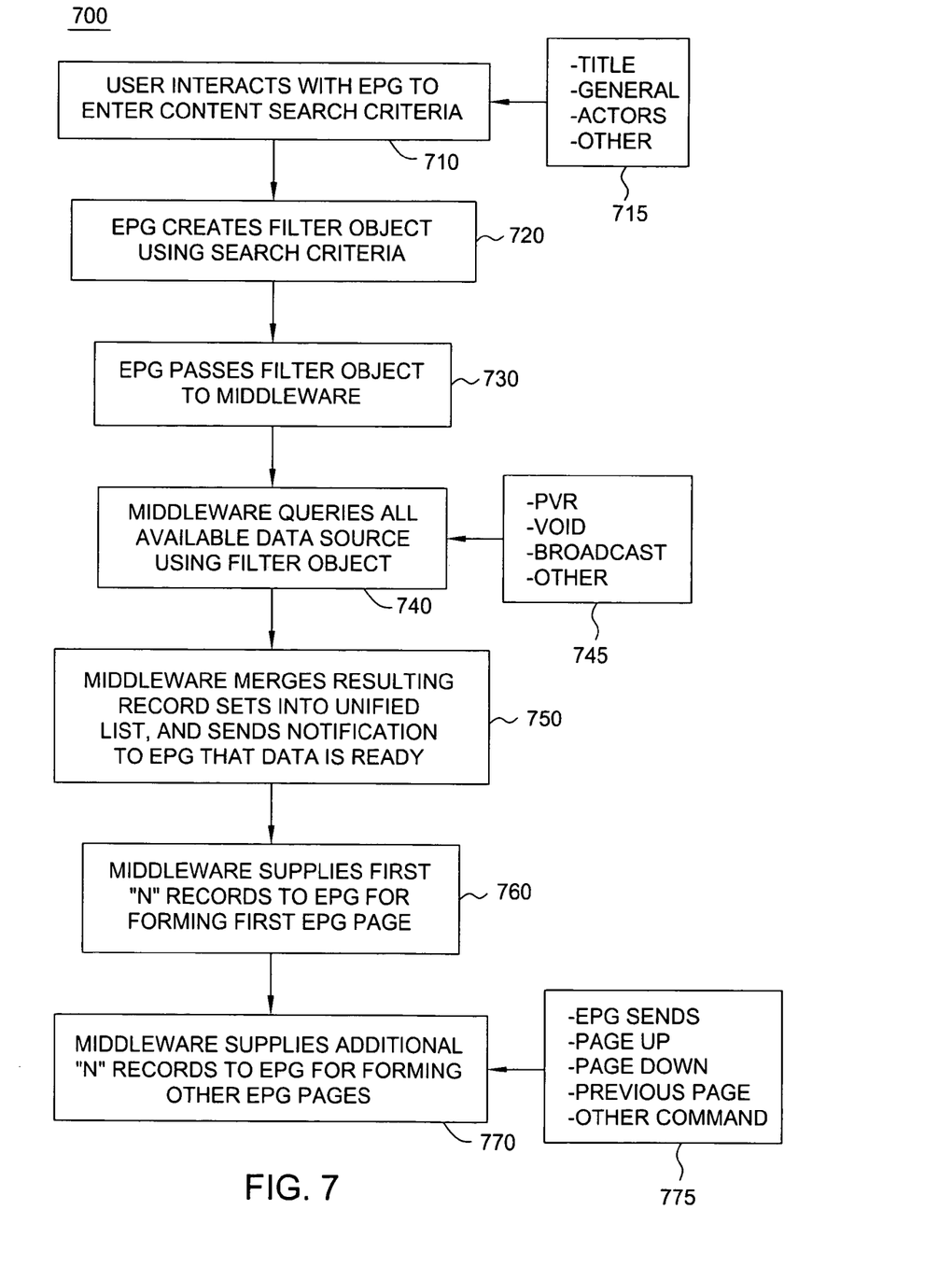
FIGS. 7-9 depict flow diagrams of methods according to various embodiments of the present invention.

FIG. 7 depicts a flow diagram of a method according to an embodiment of the present invention. Specifically, the method 700 of FIG. 7 depicts interactions between an electronic program guide (EPG) application and a middleware environment at a set top box to effect a merged listing of available movies or assets.

The method 700 is entered at step 710, where a user interacts with an EPG to enter content search criteria, such as (referring to box 715) all or portions of title, genre, actor name and the like. At step 720, the EPG application creates a filter object using the search criteria. At step 730, the EPG passes the filter object to the middleware. At step 740, the middleware queries all available data sources using the filter object; such data sources may comprise (referring to box 745) personal video recorder (PVR) sources, video-on-demand (VOD) sources, broadcast television or content sources and other sources or service providers.

At step 750, the middleware merges the resulting record sets into a unified list and sends a notification to the EPG application that the requested data is ready. At step 760, the middleware supplies the first N records to the EPG for formation into a first EPG page, where N is an integer. The number N of records to be returned may be a default value or a value selected by the STB in response to a user preference (e.g., a user does not want records for time slots beyond 1 week, where 3 weeks might otherwise be provided, or a value selected by the EPG application based on user interface constraints).

At step 770, the middleware supplies an additional N records to the EPG application for formation into a next EPG page. Referring to box 775, such additional N records supplied at step 770 are provided in response to EPG requests comprising a page up, page down, previous page or other command indicative of the user-desire for a different EPG page. A page up/down request is adapted to retrieve a page containing the prior/next time slots or channel groups. A previous page request is adapted to retrieve the page most recently viewed.

The above-described method of FIG. 7 contemplates the retrieval and processing of information from various databases by a middleware platform. However, in an alternate embodiment described below, the middleware platform utilizes a server or other proxy to access the databases.

Figure 8:
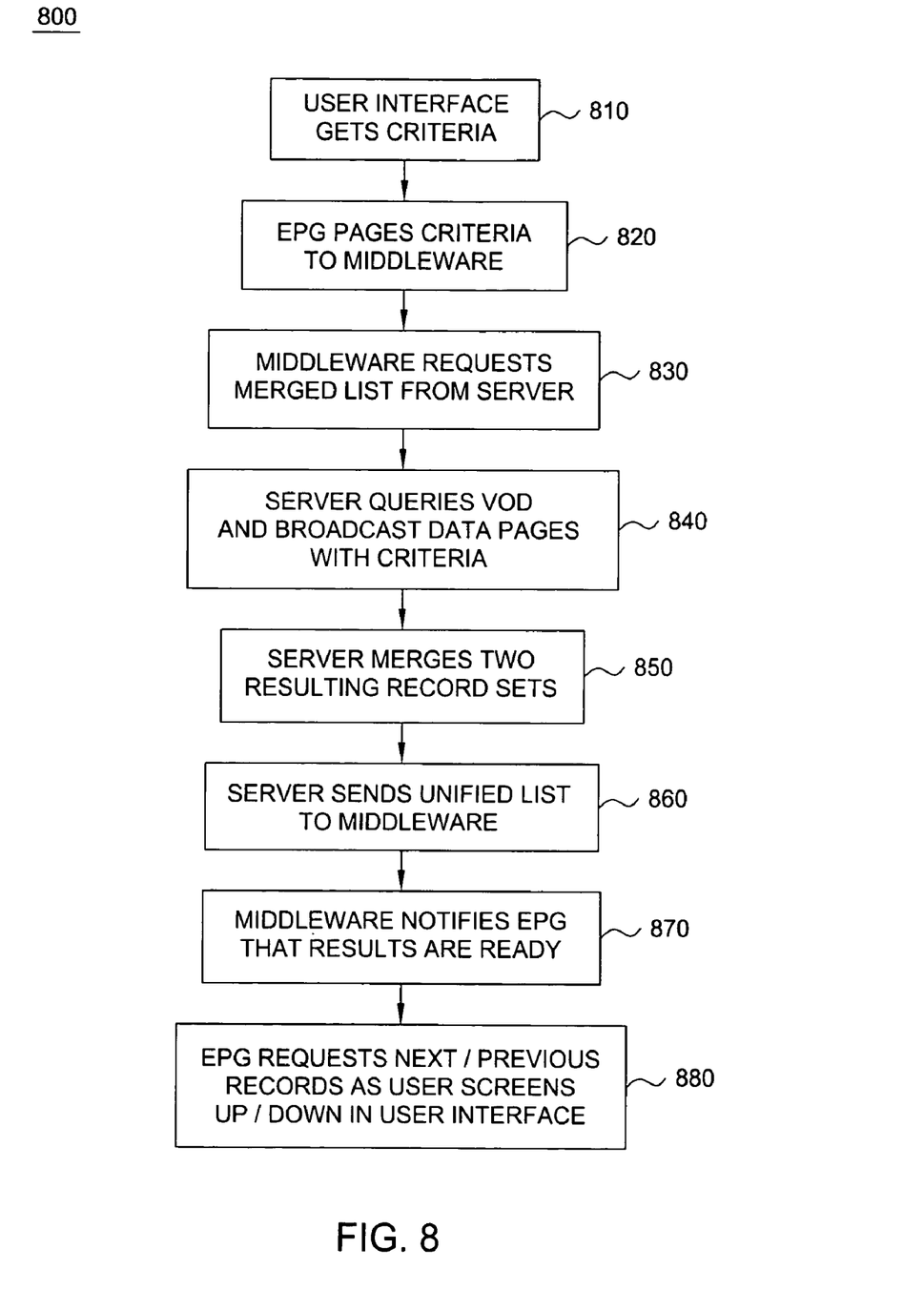

FIG. 8 depicts a flow diagram of a method according to an embodiment of the present invention. Specifically, the method 800 of FIG. 8 depicts interactions between various functional elements including a proxy server adapted to provide filtered and unified lists of available movies and/or video assets from the VOD services database $105_1$ and the Broadcast services database $105_2$.

At step 810, a user interface retrieves the criteria to be searched. At step 820, an EPG application passes the criteria to the middleware. At step 830, the middleware requests a merge list from a server or other proxy, illustratively server 110 in the system 100 of FIG. 1. At step 840, the server queries VOD and broadcast databases utilizing the search criteria. At step 850, the server merges the two record sets resulting from the queries made to the databases. At step 860, the server sends a unified list to the middleware, which in turn adds any additional listing data to the unified list (e.g., PVR listings/data). At step 870, the middleware notifies the EPG application that the search results are ready. At step 880, the EPG application requests next/previous records in response to user input indicative of up/down scrolling of EPG pages. Generally speaking, at step 830 the middleware requests n elements of the merged list from the server and at step 860 the server returns up to n elements. At step 880, when the EPG requests next/previous, the middleware goes back to step 830 and asks for the next/previous n elements if the previous n received can't satisfy the new request.

Figure 9:
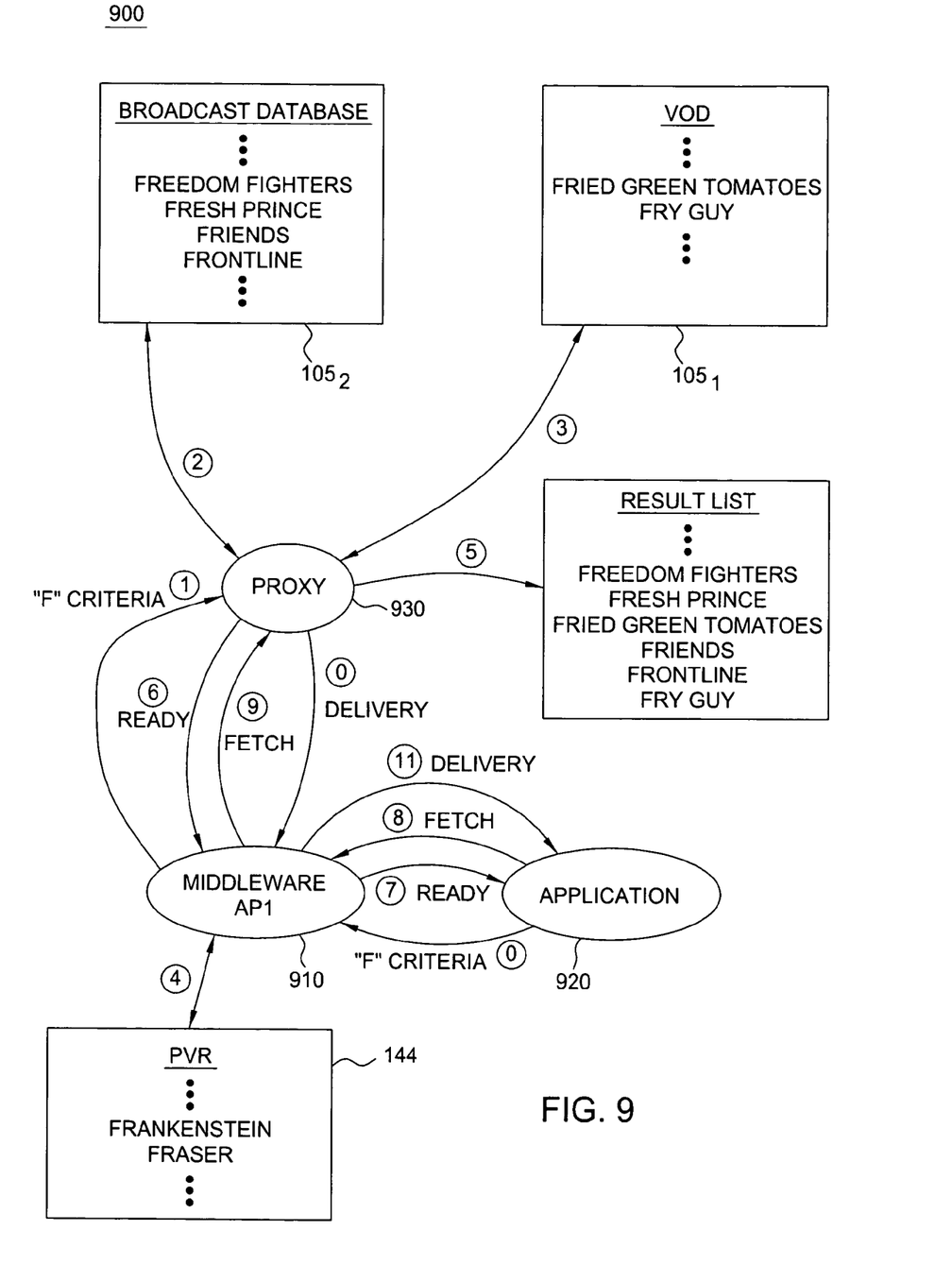

FIG. 9 depicts a relational diagram of various functional elements in accordance with an embodiment of the present invention. Specifically, the relational diagram 900 of FIG. 9 depicts the relationships between a middleware application programming interface 910, an application 920 such as an EPG application, a proxy 930, a broadcast database $105_2$, a VOD database $105_1$ and a PVR database 144.

At step 0, the application 920 sends criteria to the middleware API 910, illustratively a search on titles beginning with the letter "F." At step 1, the search criteria is forwarded to the proxy 930. At step 2 and 3, the proxy 930 forwards the search criteria to, respectively, the broadcast database $105_2$ and the VOD database $105_1$. In response, each of these databases provides the titles (and related/requested data) pertaining to any movies or assets conforming to the search criteria. At step 4, the middleware API 910 forwards the search criteria to the PVR database 144, which responsively provides the titles (and related/requested data) pertaining to any PVR movies or assets conforming to the search criteria.

At step 5, a results list is generated incorporating the search results from each of the two databases. At step 6, the proxy 930 notifies a middleware API 910 that the results list has been formed, and at step 7 the API 910 in turn notifies the application 920. At step 8, a fetch command is propagated from the application 920 to the API 910, which is in turn propagated to the proxy 930 at step 9. At step 10, at least a portion of the results list is retrieved by the proxy 930 and forwarded to the middleware API 910, where it is subsequently merged with the PVR list and delivered to the application 920. While not shown, the middleware API 910 propagates a fetch command to the PVR database 144, retrieves a results list from the PVR database 144 and delivers the requested data (either by itself or in a merged list with other requested database data) to the application 920.

In various embodiments, the proxy performs a unification of the broadcast and VOD database results, and sends that partial list back to the middleware. The middleware performs a merge between the server list and the PVR database results. It is noted that STBs with PVR functionality are typically high powered boxes and the number of assets in the PVR database is relatively small (on the order of 10s), whereas Broadcast and VOD databases will have thousands (if not tens of thousands) of entries to merge.

In various embodiments, the STB reduces the amount of downstream traffic necessary to satisfy STB requests by limiting the results list associated with a request. This is accomplished by, illustratively, adapting the criteria to reflect a desire for a limited amount of returned data to the STB (e.g., upcoming day or week).

In various modifications to the above embodiments, the filter criteria sent from the middleware API to the proxy server (or other server) includes a starting index and maximum count value. The server creates a unified list, but only returns a maximum count of elements (e.g., n) beginning from the starting index position (e.g., a certain time or title). When an EPG application asks for a next/previous page, the existing filter criteria is propagated to the server with a different starting index, where the index is modified in a manner adapted to retrieving a next or previous page of EPG data.

In various embodiments of the invention, the queries and associated results list are cached by the server. For example, where a limited amount of data is desired, the server may obtain more that the limited data (e.g., more days or weeks) and cache the extra data in anticipation of a request for the data via, for example, a next page command.

While the foregoing is directed to certain embodiments of the present invention, these embodiments are meant to be illustrative, not limiting. Other and further embodiments of the invention may be devised without departing from the basic scope thereof, which is to be determined by the following claims.

We claim:

1. A computer-implemented method, comprising:
    processing, at a proxy server, a filter object indicative of search criteria, the filter object being received from a middleware application programming interface (API);
    querying, by the proxy server, each of a plurality of data sources using the search criteria;
    merging, at the proxy server, record sets provided by the queried data sources into a unified list of records, the unified list of records identifying assets remotely stored by at least one of the plurality of data sources, wherein at least one record in the record sets comprises an extension portion and a priority portion; wherein the priority portion indicates that a first class of a plurality of classes of devices is to process the extension portion; wherein the priority portion identifies a never store priority level, a low priority level, a high priority level, or an always store priority level; and wherein the first class is a low end class, a mid-range class, or a high end class;
    providing a notification that the unified list of records is available; and delivering the unified list of records to the middleware API for merging the unified list of records with a second list of records resulting from the middleware API querying a local storage device using the filter object, the second list of records identifying assets locally stored on the storage device.

2. The method of claim 1, wherein the data sources comprise a broadcast listing source, and a video-on-demand (VOD) asset listing.

3. The method of claim 2, wherein the broadcast listing source comprises a plurality of broadcast events, and wherein each of the broadcast events is associated with a channel parameter and a time parameter.

4. The method of claim 1, wherein said proxy server caches portions of said unified list of records.

5. The method of claim 4, wherein said cached portions comprise records likely to be requested by a subsequent filter object.

6. The method of claim 1, wherein said middleware API exists within a middleware environment in a set top box (STB).

7. The method of claim 1, further comprising limiting a number of results associated with the search criteria.

8. The method of claim 1, wherein the priority portion indicates whether each of the plurality of classes is to store the extension portion.

9. The method of claim 1, wherein the at least one record comprises a base portion that is processable by all of the plurality of classes.

10. The method of claim 9, wherein the extension portion is one of a plurality of extension portions each being associated with a respective priority portion.

11. A computer readable storage medium comprising computer-readable instructions, that when executed, cause an apparatus to perform operations comprising:
    processing a filter object indicative of search criteria;
    querying each of a plurality of data sources using the search criteria of the filter object, the data sources comprising a broadcast listing source, and a video-on-demand (VOD) asset listing;
    merging record sets, provided by the queried data sources into a merged list of records, the merged list of records identifying assets remotely stored by at least one of the plurality of data sources, wherein at least one record in the record sets comprises an extension portion and a priority portion;
    wherein the priority portion indicates that a first class of a plurality of classes of devices is to process the extension portion; wherein the priority portion identifies a never store priority level, a low priority level, a high priority level, or an always store priority level; and wherein the first class is a low end class, a mid-range class, or a high end class;
    providing a notification that the merged list of records is available; and
    causing delivery of the merged list of records to a middleware application programming interface (API) for merging with a second list of records resulting from the middleware API querying a personal video recorder (PVR) using the filter object, the second list of records identifying assets locally stored on the PVR.

12. A computer-implemented method, comprising:
processing, at a proxy, a filter object indicative of search criteria, the filter object being received from a middleware application programming interface (API);
querying, by the proxy, each of a plurality of data sources using the search criteria, the data sources comprising a broadcast listing source, and a video-on-demand (VOD) asset listing;
merging, at the proxy, record sets provided in response to the queries into a merged list of records, the merged list of records identifying assets remotely stored by at least one of the plurality of data sources, wherein at least one record in the record sets comprises an extension portion and a priority portion;
wherein the priority portion indicates that a first class of a plurality of classes of devices is to process the extension portion; wherein the priority portion identifies a never store priority level, a low priority level, a high priority level, or an always store priority level; and wherein the first class is a low end class, a mid-range class, or a high end class;
providing, by the proxy, the merged list of records to the middleware API;
querying, by the middleware API, a personal video recorder (PVR) asset listing using the filter object to obtain a PVR asset record set of assets locally stored on a PVR;
merging, by the middleware API, the PVR asset record set with the merged list of records to create a unified list of records; and
providing, by the middleware API, a notification to an electronic program guide (EPG) application that the unified list of records is available.

13. A method, comprising:
processing, by a processor, a list of records merged from record sets provided by queried data sources that satisfy search criteria, the list of records identifying assets remotely stored by at least one of a plurality of data sources, wherein at least one record in the record sets comprises an extension portion and a priority portion; wherein the priority portion indicates that a first class of a plurality of classes of devices is to process the extension portion;
wherein the priority portion identifies a never store priority level, a low priority level, a high priority level, or an always store priority level; and wherein the first class is a low end class, a mid-range class, or a high end class;
querying a personal video recorder (PVR) asset listing to obtain a PVR asset record set of assets locally stored on a PVR that conform to the search criteria;
merging the PVR asset record set with the list of records to create a unified list of records; and
providing a notification to an electronic program guide (EPG) application that the unified list of records is available.

14. The method of claim 13, wherein a filter object is received from an electronic program guide (EPG) application requesting content schedule information corresponding to the search criteria.

15. The method of claim 14, further comprising:
providing to said EPG application a first plurality of records from said unified list of records; and
providing additional pluralities of records in response to control commands received from said EPG application.

16. The method of claim 15, wherein said control commands comprise at least one of a page up command, a page down command, and a previous page command.

17. The method of claim 16, wherein said control commands comprise a starting index value indicative of a first record to be returned, said page up and page down commands comprising common filter objects associated with different starting index values.

18. The method of claim 13, further comprising:
providing a first plurality of records from the unified list of records to the EPG application; and
providing additional pluralities of records from the unified list of records to the EPG application in response to control commands received from the EPG application.

19. The method of claim 18, further comprising:
adding additional listing data to the unified list of record sets before providing the notification to the EPG application.

20. The method of claim 13, wherein the list of records satisfying the search criteria represents results of a search of a broadcast listing source and a video-on-demand (VOD) asset listing.

21. The method of claim 13, further comprising processing the extension portion in response to determining by the processor that a device associated with the processor is within the mid-range class or the high end class.

22. An apparatus comprising:
a processor; and
memory storing instructions that when executed by the processor, cause the apparatus to perform operations comprising:
processing a list of records merged from record sets provided by queried data sources that satisfy search criteria, the list of records identifying assets remotely stored by at least one of a plurality of data sources, wherein at least one record in the record sets comprises an extension portion and a priority portion; wherein the priority portion indicates that a first class of a plurality of classes of devices is to process the extension portion; wherein the priority portion identifies a never store priority level, a low priority level, a high priority level, or an always store priority level; and wherein the first class is a low end class, a mid-range class, or a high end class;
querying a personal video recorder (PVR) asset listing to obtain a PVR asset record set of assets locally stored on a PVR that conform to the search criteria;
merging the PVR asset record set with the list of records to create a unified list of records; and
providing a notification to an electronic program guide (EPG) application that the unified list of records is available.

23. The apparatus of claim 22, wherein the list of records represents results of a search of a broadcast listing source and a video-on-demand (VOD) asset listing.

* * * * *